Oct. 15, 1929.   W. SCHAAKE   1,731,940
TROLLEY SYSTEM
Filed July 15, 1927   3 Sheets-Sheet 1

INVENTOR
William Schaake.
BY
ATTORNEY

Oct. 15, 1929.   W. SCHAAKE   1,731,940
TROLLEY SYSTEM
Filed July 15, 1927   3 Sheets-Sheet 2

INVENTOR
William Schaake.
BY
ATTORNEY

Oct. 15, 1929.                W. SCHAAKE                1,731,940
                              TROLLEY SYSTEM
                          Filed July 15, 1927        3 Sheets-Sheet 3

INVENTOR
William Schaake.
BY
ATTORNEY

Patented Oct. 15, 1929

1,731,940

UNITED STATES PATENT OFFICE

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA

TROLLEY SYSTEM

Application filed July 15, 1927. Serial No. 205,859.

My invention relates generally to trolley systems and more particularly to switches for connecting the trolley structures of such systems in different circuits.

The object of the invention, generally stated, is the provision of switches and interlocking attachments for trolley structures that shall be simple and efficient in operation and capable of being readily and economically manufactured.

A more specific object of my invention is to provide for automatically isolating or grounding the trolley structures of trolley systems when they are lowered to inactive positions.

Another object of my invention is to provide for interlocking the trolley structure and its grounding switch to prevent the trolley shoe from being raised until the grounding switch is disconnected.

It is also an object of the invention to provide for retaining the trolley structure in a work circuit only while it is in its raised position.

Other objects of the invention will, in part, be obvious and will, in part, appear hereinafter.

The invention, accordingly, is disclosed in the embodiment thereof shown in the accompanying drawings, and comprises the structural features and the combination of elements and arrangement of parts which will be exemplified in the structure hereinafter set forth, and the scope of the application of which will be indicated in the claims.

For a fuller understanding of the invention, reference may be had to the following detailed description, taken in connection with the accompanying drawings, in which.

Figure 1:
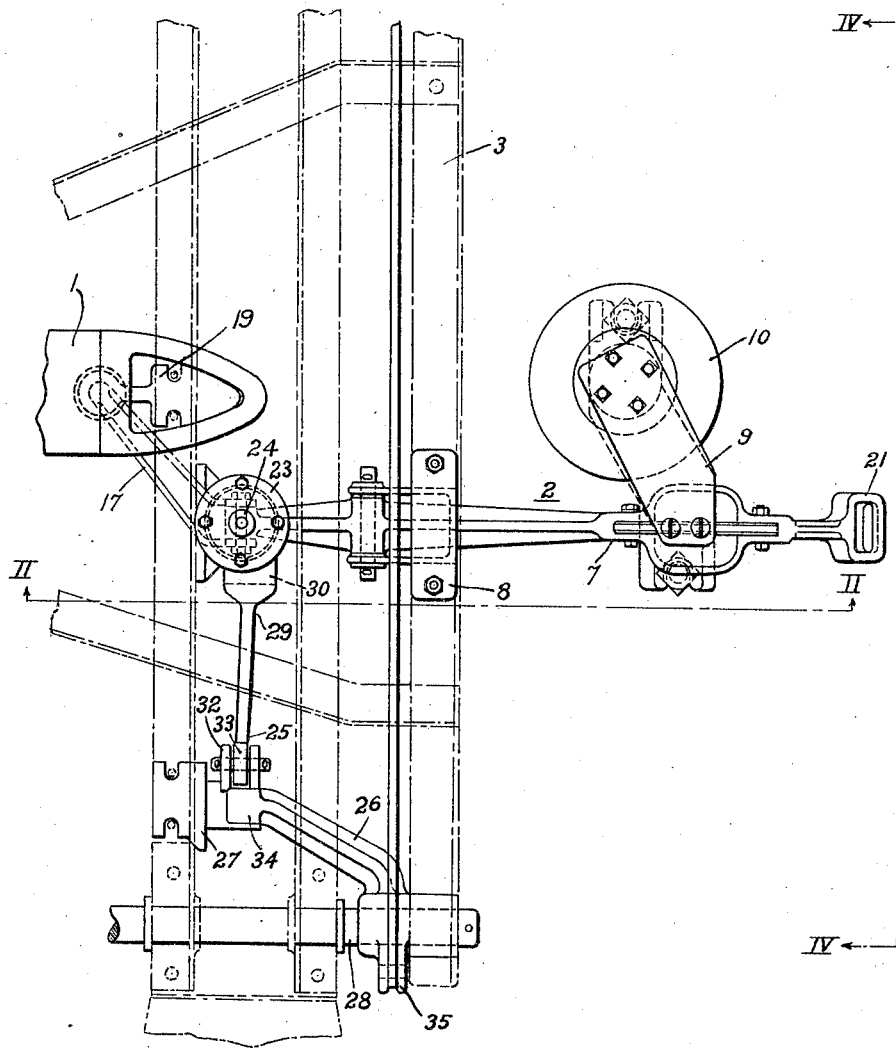
Figure 1 is a top plan view of a portion of a trolley structure and a switch for connecting the trolley shoe in different circuits.

In the drawings, I have illustrated a portion of a pantograph trolley shoe 1, a switch 2 for connecting it in different circuits, and a portion of a pantograph trolley frame work 3 as mounted upon the roof of a trolley car represented by the dotted line 4.

The pantograph trolley structure or frame work has not been fully illustrated, as it does not constitute a part of my present invention and is well known in the art. The type of trolley structure preferably employed is described and illustrated in Patent No. 1,528,079, issued March 3, 1925.

The switch 2 comprises a grounding-circuit contact member 5, a work-circuit contact member 6 and a switch blade 7. The grounding contact member 5 is mounted upon a support 8 that is secured to the roof of the car and is connected to ground in the usual manner. The work-circuit contact member 6 is secured to an arm 9 that is mounted upon an insulator 10 which is located upon one end of the supporting member 8. As shown, the switch blade 7 is pivotally mounted upon a supporting member 11 that is secured to the frame work 3.

The switch blade 7 is biased toward the grounding contact member by a spring 12 but a toggle lever 13 having a biasing spring 13' locks it in the work circuit when the trolley shoe 1 is in an active position. The biasing spring 12 is mounted, under tension, in a cylinder 14 which is secured to the frame work 3 and is connected, through a rod 16 to an extension 15 provided on the switch blade 7. The toggle lever 13 is mounted between the lower end of the cylinder and the extension 15 on the switch blade and it is provided with a tripping arm 17 that extends under one end of a plunger 18 that is operated by the lowering of the trolley shoe.

The plunger 18 is slidably mounted in a bracket 19 on the frame work 3 and is provided with a spring 20 that biases it to an upper position out of contact with the tripping arm 17.

In order that the switch blade 7 may be disconnected from the grounding circuit and be connected in the work circuit, its outer end is provided with a handle 21 that is adapted to be operated by a pole or any other suitable means.

At times, it will be found desirable to operate the switch by some means located within the car. For this purpose, the cylinder 14 has been extended upwardly and is provided with a piston 22 that is connected to the upper end of the rod 16 which connects the biasing spring 12 to the switch blade. The cylinder 14 is covered by an end plate 23 and is connected by a pipe 24, to a suitable source of air pressure (not shown), the control of which may be located within the car.

Figure 2:
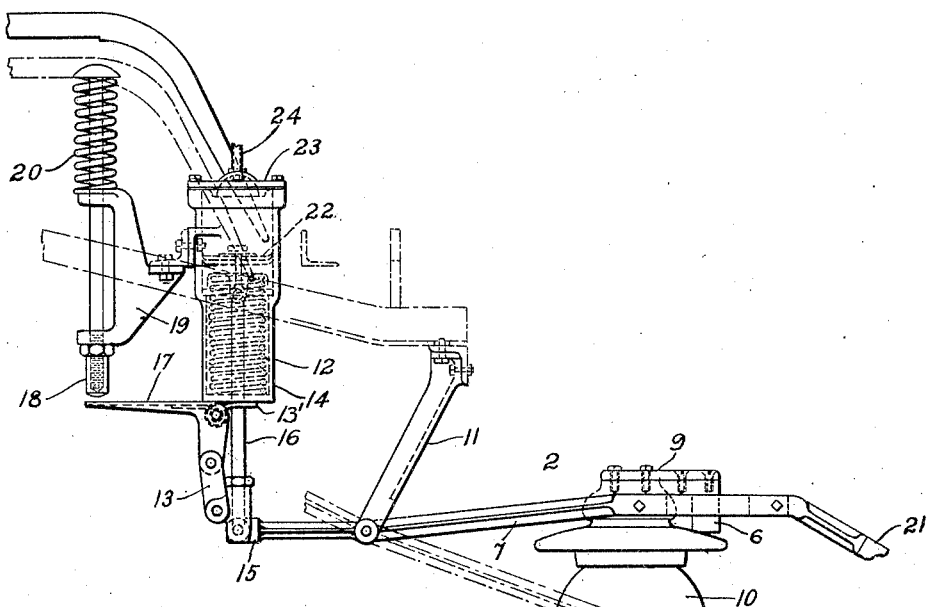
Fig. 2 is an end view, taken on the line II—II of Fig. 1, showing the trolley shoe connected in a work circuit.
Figure 3:
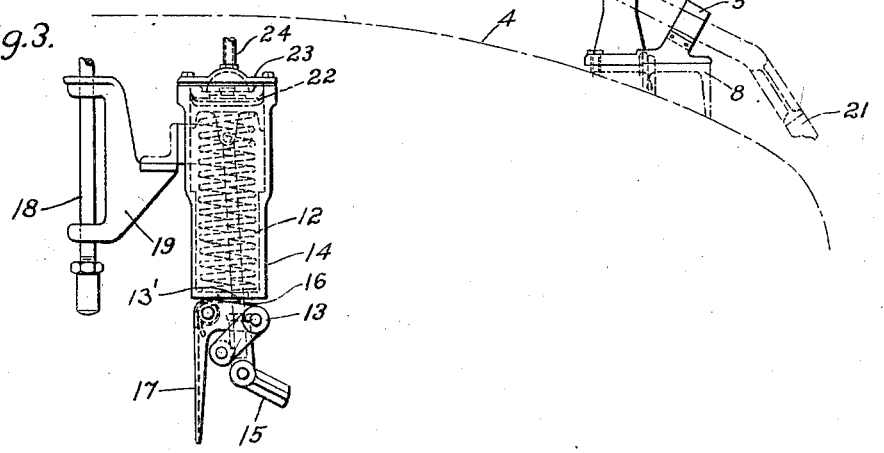
Fig. 3 is a view, partly in side elevation and partly in section, of the toggle device constituting a part of the mechanism illustrated in Fig. 2 in the position it assumes when the trolley shoe is connected in a grounding circuit.
Figure 4:
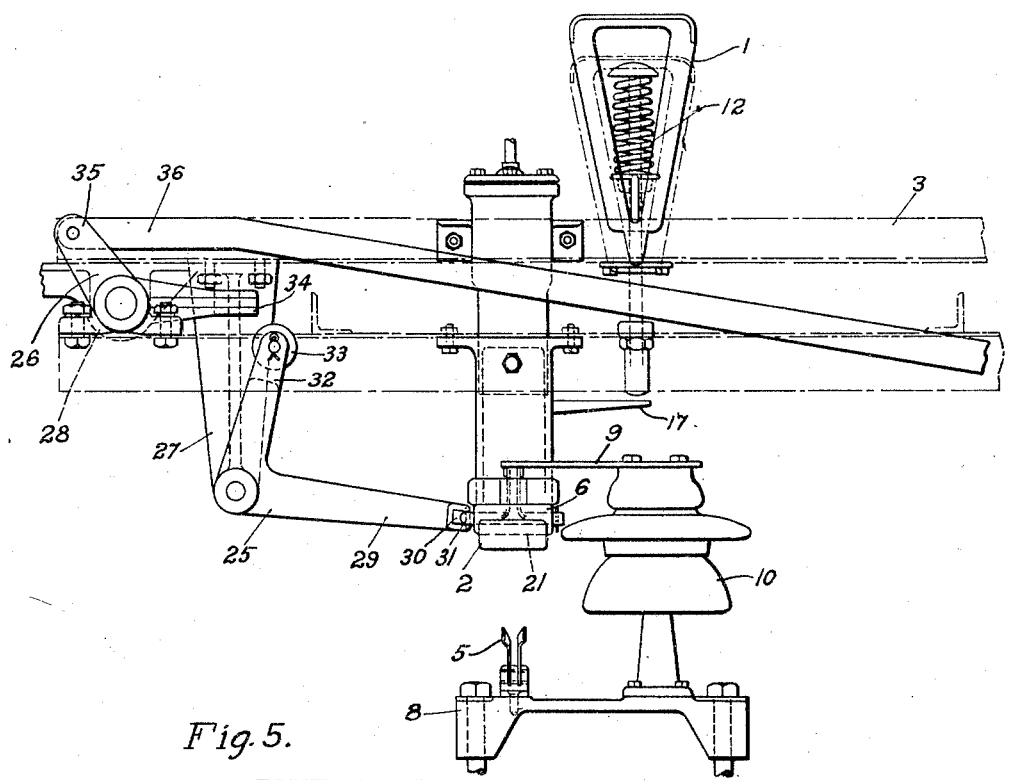
Fig. 4 is a view, in side elevation, taken on the line IV—IV of Fig. 1.
Figure 5:
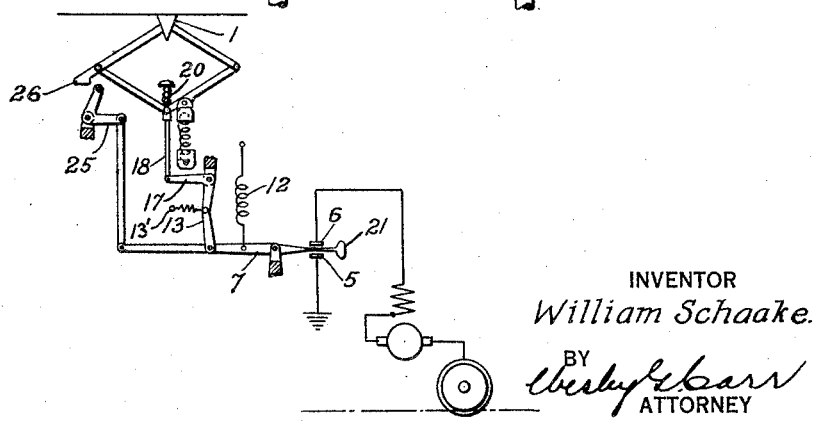
Fig. 5 is a diagrammatic illustration of the invention, as embodied in a trolley system.

When the trolley shoe 1 is in its lower or inactive position and the switch blade 7 is in contact with the grounding contact member 5, (as shown by the dotted line in Fig. 2) the switch blade and the trolley structure are interlocked to prevent the trolley shoe from rising until the switch blade is disconnected from the grounding circuit. The interlocking mechanism comprises a pair of bell-crank levers 25 and 26 that are rotatably supported in cooperative relation to each other upon brackets 27 and 28, respectively, which are secured to the frame work on the car roof.

One end 29 of the lower lever 25 is provided with a slot 30 which is adapted to receive a lug 31 that is disposed on one side of the extension 15 of the switch blade in such manner that the lever 25 will be turned upon its axis when the switch blade is moved. The other end 32 of the lever 25 extends upwardly and is provided with a wheel 33 that facilitates its travel under the free end 34 of the cooperating bell-crank lever 26 when the latter is in a position corresponding to the inactive position of the trolley shoe. The other end 35 of the cooperating lever 26 is pivotally connected to the trolley structure by a link 36 in such manner that the free arm or end 34 of the upper lever will be moved into a horizontal position when the trolley shoe is lowered to its inactive position and downwardly when the trolley shoe is raised. When the free end of the upper bell-crank lever 26 is in a horizontal position, the wheel 33 on the end of the lower bell-crank lever that is connected to the extension on the switch-blade is free to travel under it and lock it, thereby preventing the trolley shoe from moving upwardly until the switch blade is disconnected from the grounding circuit.

In describing the operation of the invention, it will be assumed that the trolley shoe 1 is in its raised or active position and that it is connected in the work circuit, then upon lowering the trolley shoe to its inactive position, where it will strike the top of the plunger 18 to trip the toggle lever 13 and permit the biasing spring 12 to contract. The biasing spring, acting upon the rod 16, will disengage the switch blade 7 from the work-circuit-contact member 6 and move it into engagement with the grounding-circuit-contact member 5. The lowering of the trolley shoe will also actuate the link 36 to rotate the upper bell-crank lever 26 until its free end 34 is in a horizontal position. As the switch blade moves from the work-circuit position to the grounding position, the lug 31 located upon the extension 15 thereof, will actuate the lower bell-crank lever 25 so that the wheel 33 on the upper end 32 will travel under the horizontal end 34 of the upper bell-crank lever 26, thereby locking it and preventing the trolley-shoe from being raised until the switch blade is disconnected from the grounding circuit.

After the trolley shoe is lowered, if it is desired to raise it, the switch blade 7 is disconnected from the grounding circuit by means of a hook pole (not shown) that may be inserted into the handle 21 of the switch, or by the admission of compressed air into the cylinder 14. The movement of the switch blade from the grounding circuit to the work circuit will actuate the lower bell-crank lever 25 to unlock the upper bell-crank lever 26 and link 36, thus permitting the trolley shoe to rise to its active position. At the same time, the movement of the switch blade 7 to the work-circuit position will reset the toggle lever 13 for the next operation.

While the illustrated example constitutes a particular embodiment of my invention, I do not limit myself strictly to the details shown, since the same may be varied considerably without departing from the spirit of the invention as defined in the appended claims.

I claim:—

1. In a trolley system, in combination, a trolley shoe, a switch for connecting the trolley shoe in different circuits to establish ground and work circuits, and interlocking means between the switch and the trolley shoe for preventing the raising of the trolley shoe when the ground circuit is established.

2. In a trolley system, in combination, a trolley shoe, a switch for connecting the trolley shoe in different circuits to establish ground and work circuits, and locking means interposed between the switch and the trolley shoe for retaining the switch in a predetermined position and for preventing the breaking of the work circuit when the shoe is in a collecting position.

3. In a trolley system, in combination, a trolley shoe, a switch for connecting the trolley shoe in different circuits, and locking means between the switch and the trolley shoe for preventing the raising of the trolley shoe when the switch is in one position and means operable in response to the raising of the trolley shoe for preventing manual actuation of the switch when the trolley shoe is in its raised position.

4. The combination with a trolley shoe biased to a collecting position, of a switch for connecting the trolley shoe in different circuits to establish ground and work circuits, means operated by the trolley shoe for actuating the switch to interrupt the work circuit when the trolley shoe is lowered and to etsablish the ground circuit, and interlocking means for locking the trolley in its lowered position when the ground circuit is established.

5. The combination with a trolley shoe and means for biasing the shoe to a collecting position of a switch for connecting the shoe in a work circuit, means for biasing the switch to an open position, and a toggle lever for locking the switch in closed position, said toggle lever being disposed to be operated by the shoe to release the switch to permit it to move to an open position when the shoe is lowered to an inactive position.

6. The combination with a trolley shoe and means for biasing the shoe to a collecting position, of a work-circuit contact member, a ground-circuit contact member, a movable contact member, means for biasing the movable-contact member toward the ground contact-member, a toggle lever for locking the movable contact member in contact with the work-circuit contact member, and a biased plunger disposed to be operated by the trolley shoe for actuating the toggle lever to release the movable contact member from contact with the work-circuit contact member when the trolley shoe is lowered to an inactive position.

7. The combination with a trolley shoe and means for biasing the shoe to a collecting position, of a work-circuit contact member, a ground-circuit contact member, a movable contact member, means for biasing the movable contact member toward the ground-contact member, a toggle lever for locking the movable contact member in contact with the work-circuit contact-member, a biased plunger disposed to be operated by the trolley shoe for actuating the toggle lever to release the movable contact member from contact with the work-circuit contact member when the trolley shoe is lowered to an inactive position, and interlocking means for locking the trolley in its inactive position when the movable contact member is in contact with the ground contact member.

In testimony whereof, I have hereunto subscribed my name this 7th day of July, 1927.

WILLIAM SCHAAKE.